April 29, 1958     J. C. FISK     2,832,149
GAUGE
Filed Sept. 17, 1956
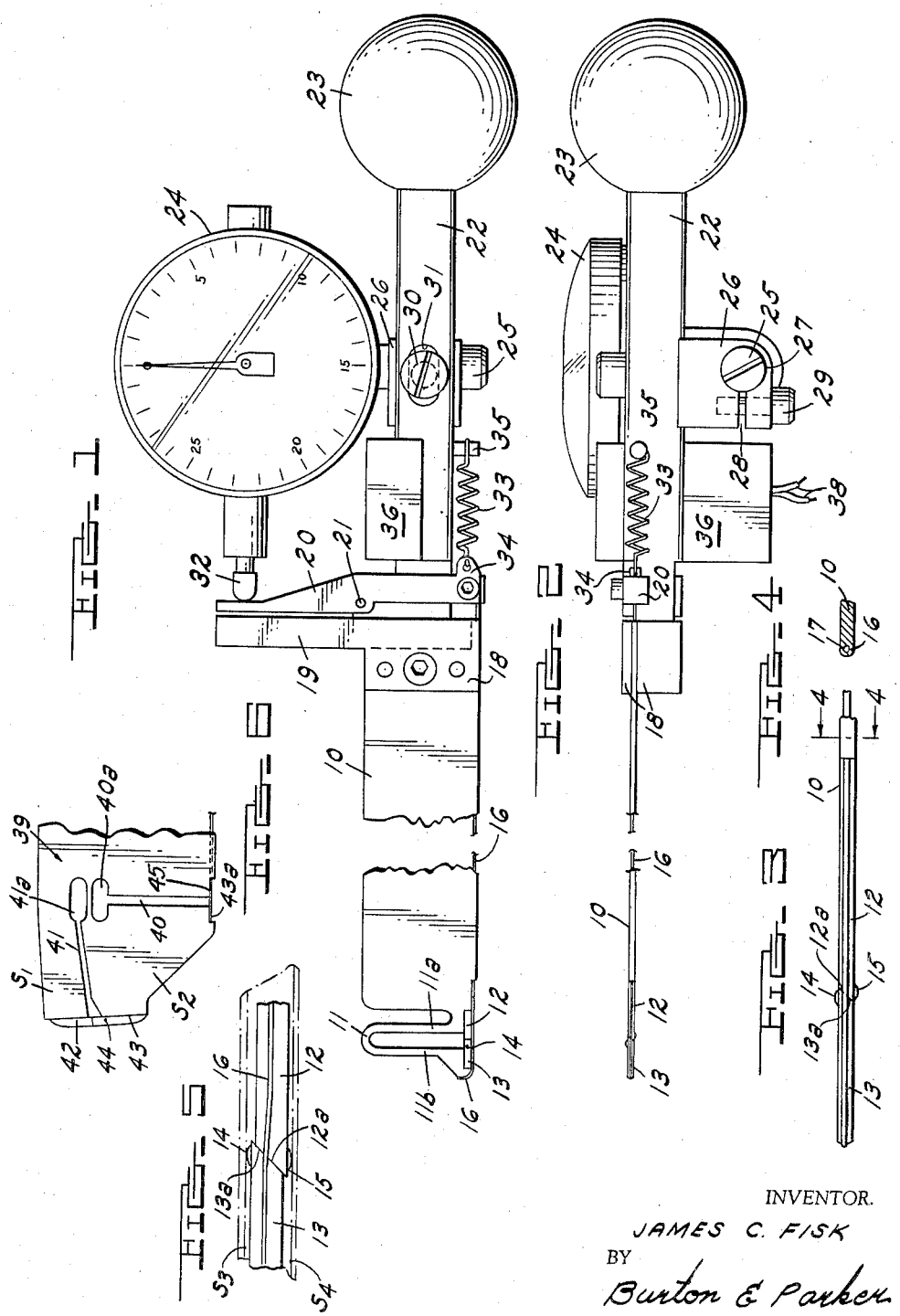
INVENTOR.
JAMES C. FISK
BY
Burton & Parker
ATTORNEYS

United States Patent Office 2,832,149
Patented Apr. 29, 1958

2,832,149
GAUGE
James C. Fisk, Flint, Mich.
Application September 17, 1956, Serial No. 610,305
10 Claims. (Cl. 33—147)

This invention relates to a gauge and, more particularly, to an improved gauge structure for measuring or determining a distance between spaced-apart surfaces.

In many industrial applications, it is necessary to gauge accurately the distance between two companion or associated surfaces or wall members. For example, in the industrial applications of atomic energy, an acute problem of gauging has developed in the reactors which convert the atomic energy into power. In these reactors, there are a series of spaced plates assembled together to form channels which, as an illustration, may have a minimum thickness of 0.035", a minimum width of 2" and at present a maximum length of 100". Due to inaccuracies, presently unavoidable in fabrication, it is necessary to measure the thickness of each channel and its complete length along three lines, one near each side extremity and one along a central axis. The purpose of measurement is not merely to determine whether the channel dimensions come within predetermined tolerances, but the measurement is also for collecting data to be used in computing factors for corrective adjustments which are confidential in nature. Thus, the gauge needs calibration accuracy as well as continued accuracy under repetitive use.

Another area of an atomic reactor requiring accurate gauging is one in which a plurality of tubes are arranged parallel to each other. It is often desirable to measure the spacing between adjacent tubes throughout the pattern of tube disposition and along most of the axial length of the tubes.

At present no gauge is known which accurately measures the distance between spaced surfaces, such as in the described two instances, although considerable research has been directed toward this problem.

An important object of this invention is to provide an improved form of gauge which accurately measures or quantitatively reflects the distance between spaced surfaces. Another important object of the invention is to provide a gauge having contacting means which move relatively to each other to engage spaced-apart surfaces, the extent of the relative movement being a measure of the distance between those surfaces. A further important object of the invention is to provide a gauge having relatively movable contact points for simultaneously engaging the spaced surfaces and including means to translate the relative movement of the contact points into axial movement along the gauge, the axial movement actuating an indicator.

In carrying out the invention, the present gauge has a probe member provided with contacting means for each spaced surface. At least one of the contacting means is movable with respect to the probe, so that the contacting means may simultaneously engage both of the spaced surfaces. The amount of travel of the movable contacting means may be relayed along the probe member to a suitable sensing or indicating device.

In one form, for example, the probe member has two portions or sections which are flexibly joined together. Each portion has a camming surface slidably abutting the camming surface of the other portion, so that the portions can move relatively to each other and laterally of the probe until a contact area on each portion strikes one of the surfaces. A wire fixed to a movable portion extends longitudinally of the probe and moves axially thereof in response to the relative movement between the flexibly joined probe portions. The wire pivots a lever on the gauge which, in turn, actuates an indicator that quantitatively reflects the distance between the spaced surfaces as determined by the described movements. In the preferred embodiment, a vibrator shakes the probe member and a spring tensions the wire to urge the camming surfaces together, both of which ensure accurate results.

A further object of the invention is the provision of a gauge having a long thin probe member which is flexible in at least one plane and at one end of which is provided with a pair of contacts shiftable transversely of the probe relative to each other and each provided with a camming surface abutting the camming surface of the other to translate relative movement transversely of the probe to a movement longitudinally of the probe, with means for indicating such longitudinal movement disposed adjacent the opposite end of the probe from the end provided with the contacts and connected to the contacts by a flexible wire extending through a channel in the probe, whereby any flexing of the probe in said plane will be accompanied by a flexing of the wire such that the relative position of the wire and probe at opposite ends remains constant regardless of the flexing of the probe.

Various other objects, advantages, and meritorious features of the invention will become more fully apparent from this specification, appended claims, and accompanying drawings, wherein:

Fig. 1 is a side view of a gauge embodying the present invention;

Fig. 2 is a bottom plan view of Fig. 1;

Fig. 3 is an enlarged view of the outer end of the probe member of Figs. 1 and 2, illustrating contact points on the probe and camming surfaces in a normal abutting relation;

Fig. 4 is a section of Fig. 3 on the line IV—IV;

Fig. 5 is a still further enlarged, partial, diagrammatic view of the probe of Fig. 3 showing the camming surfaces after relative movement and the contact points engaging spaced surfaces with a resulting shortening of a wire; and Fig. 6 is a side view of a modified probe member.

Referring to Figs. 1–5, the gauge illustrated includes a probe generally shown at 10 composed preferably of metal and having the form of a long strip which is sufficiently thin to permit free passage through the minimum distance between spaced-apart surfaces or walls of a channel to be measured. The cross section of probe 10, shown in Fig. 4, should be maintained for a sufficient length to reach the farthest point between spaced surfaces where measurement is desired.

The probe 10 has two sections or portions flexibly hinged or joined together, each of which has a contact area for engaging one of the spaced surfaces or walls. In the embodiment of Figs. 1–5, the gauging extremity of probe 10 has a flexible appendage defined by an inverted U-shaped terminus 11. The inner leg 11a of the terminus is substantially fixed with respect to the probe 10, while the outer leg 11b is free for movement relatively to the leg 11a. These legs have contact elements 12 and 13 which slidably abut one another along camming surfaces 12a and 13a, respectively. As shown in Figs. 3 and 5, the camming surfaces abut each other along a plane biased with respect to a longitudinal axis of probe 10, so that the movement of leg 11b and contact element 13 is substantially transversely and longitudinally of the probe 10. The contact elements have contact points 14 and 15, each of which engages one of the spaced-apart surfaces as is hereinafter more fully noted. A wire 16 fixed to the outer leg 11b extends longitudinally of the probe 10 through a passageway 17 (Fig. 4).

The probe 10 is bolted to and between spaced sides 18 which extend from a plate 19. A lever 20, for which the plate 19 serves as an outward stop and guard, is pivoted at 21 to a medial portion of the gauge which may be fixed to or integral with the plate 19, and includes a supporting rod 22 terminating in a handle 23. The other end of the wire 16 is attached to the lower end of the lever 20. The rod 22 carries a dial indicator 24 having a stem 25. A block 26 on the rod 22 has an opening 27 to receive the stem 25 and a slot 28 communicating with the opening 27. A threaded fastener 29 screws into or out of the block 26 across the slot 28 to tighten or loosen the grip of the block 26 on the stem 25. Thus the vertical position of the indicator 24, as viewed in Fig. 1, can be readily adjusted. In a like manner a cap screw 30 threaded into block 26 extends through a slot 31 in the rod 22 to adjust the position of the indicator 24 axially of the rod.

In the embodiment shown, the indicator 24 has a telescoping needle 32 and is actuated by pivoting of the lever 20 and axial travel of the needle 32 in a manner known in the art. Instead of a dial indicator, any suitable sensing device may be used, such as an electronic or air gauge, for translating the results of measurement into amplified visual readings and/or graphic recordings. The sensing device and/or associated means preferably incorporates means for adjusting the gauge amplifying ratio for quantitative coordination between the measurement afforded by the contact elements and the calibrations of the sensing device. Such means are well known in the art and therefore need not be described in detail.

The wire 16 which transmits the measuring motion axially of the probe 10 is preferably held in tension during the measuring function. Leg 11b of the U-shaped flexible appendage may be distorted to provide a spring force, and suitable spring means pulls on the wire 16 in a direction away from the appendage. The resultant of the spring forces urges the camming surfaces 12a and 13a toward each other to ensure their engagement with the spaced surfaces and also to actuate positively the sensing device. In the embodiment shown, the wire 16 is tensioned by a coiled spring 33 which hooks at one end onto a lug 34 on the lever 20 and at the other end onto a lug 35 on the rod 22.

Due to the frictional engagement of the wire 16 with the sides of the passageway 17 and also due to the flexibility of the wire, it greatly assists the gauge elements to find their position of fidelity by subjecting the probe to vibrations during the measuring function. The amplitude of the vibrations should preferably be directed axially of the probe 10. The vibrations may be supplied by any suitable means, such as an electromagnet, quartz crystal, air vibrator, and the like. In the embodiment shown, a vibrator 36 may be carried by the rod 22 within a recess 37 of a size to snugly receive the vibrator. Electrical leads 38 energize the vibrator.

The flexibly joined portions of the probe may be formed in various ways. In Fig. 6, for instance, a probe 39 has slotted sides. More particularly, slots 40 and 41 have enlarged ends 40a and 41a, respectively, which are spaced closely together but maintained out of contact. This produces one section generally indicated at $S_1$ which is substantially fixed with respect to the probe 39, and a second section generally shown at $S_2$ which is free for movement relatively to section $S_1$. Section $S_2$ may, if desired, be distorted to give a clockwise spring force as viewed in Fig. 6.

It will be noted that the contact means of the embodiment of Fig. 6 is located forwardly of the probe and includes a contact element 42 associated with section $S_1$ and a contact element 43 associated with section $S_2$. These contact elements abut one another along camming surfaces as in the manner of contact elements 12 and 13, so that the movement of section $S_2$ is laterally or transversely, as well as rotationally, of the probe 39. Contact element 43 has a contact point or projection 44, and a similar contact point is located on the contact element 42 on the opposite side of probe 39. A wire 45 fixed to the contact element 43 as at 43a extends longitudinally of probe 39 as before.

In practice, the operation of either embodiment is the same. Probe 10, for example, may be inserted between spaced surfaces $S_3$ and $S_4$ as illustrated in Fig. 5. The frictional resistance to the sliding movement between the camming surfaces 12a and 13a is less than the resistance to movement of contact point 14 along the surface $S_3$ Accordingly, as the probe is moved between the spaced surfaces with the contact points 14 and 15 bearing thereagainst, as the surfaces become closer or farther apart, the contacts shift responsively. As contact 14 shifts transversely of the probe axis along the bias of the camming surface interfaces, it is also moved longitudinally by the action of the camming surfaces, and such longitudinal movement is reflected by the indicator 24. As illustrated in Fig. 5, a sector of motion longitudinally of the probe 10, produced by the relative movement of the elements 12 and 13 laterally or transversely of the probe, causes the wire 16 to move slightly in an axial direction. This axial movement trips the lever 20 which actuates the dial indicator 24.

For purposes of illustration and with no intent to limit the invention, a gauge embodying the present invention may have a functioning range of 0.020″ with a fidelity of 0.001″. It should be noted that, if desired, both contact elements can be allowed to move with respect to the probe as by slotting or otherwise hingedly mounting the same. In such a case, both contact elements move an equal amount but in opposite directions, action and reaction being equal. This structure can be used to measure greater distances between spaced surfaces, since the wire 16 will move only one-half the distance as for a corresponding measurement with the embodiment first described.

Because the probe 10 is made of very thin metal and in some instances may be upwards of 100 inches in depth, it is apparent that the probe will tend to bend in a plane extending longitudinally of the probe and at right angles to its width. However, this flexing or bending of the probe does not affect the reading of the dial indicator 24 because the wire 16 is also flexible and extends through the channel 17 formed in the probe. Because the wire assumes the same curvature or bend as the probe because of its confinement within channel 17, the relative positions of the probe and wire at opposite ends of the probe remain constant, whether the probe is held straight or not.

While the foregoing describes a presently preferred embodiment and modification, it is understood that the invention may be practiced in still other forms within the scope of the following claims.

What I claim is:

1. A gauge for measuring a distance between spaced-apart surfaces comprising: a probe member adapted to be stationed between the surfaces and having one section flexibly joined to a second section, each section having a contact point, each section slidably abutting the other along a plane biased with respect to a longitudinal axis of the probe member, one contact point being movable with its probe section along said plane away from the other contact point to engage the contact points with said surfaces and spaced apart the contact points a distance equal to said distance between the surfaces, indicating means adapted to move axially of the probe member in response to the movement of said one contact point, and means to measure the axial movement of the indicating means.

2. A gauge for measuring a distance between spaced-apart surfaces comprising: a probe member adapted to be inserted between the surfaces, said probe member having one portion flexibly joined to another portion, each portion having a camming surface slidably engaging a camming surface of the other portion for relative movement substantially transversely of the probe member, contact means on each portion adapted to engage one of the surfaces upon relative opposite movement of the portions transversely of the probe member, a filamentary member secured adjacent one end to one of said portions which is movably relatively to the probe member, said filamentary member extending longitudinally of the probe member to translate the movement of said one portion to movement axially of the probe member, and means to measure the amount of said axial movement.

3. A gauge as claimed in claim 2 wherein the probe member includes a substantially U-shaped section, the ends of the legs of the U-shape having the engaging camming sections and defining the flexibly joined portions of the probe member.

4. A gauge as claimed in claim 2 wherein the probe member is slotted to form two adjacent portions having said flexible relation with each other, each of these portions having a camming surface slidably engaging a camming surface of the other as defined.

5. A gauge as claimed in claim 2 wherein said filamentary member is a wire member, and said measuring means includes a lever mounted on the gauge and pivoted by said axial movement of the wire, and indicating scale means actuated by the lever.

6. A gauge as claimed in claim 2 further including means to vibrate the probe member to ensure accurate measurements.

7. A gauge as claimed in claim 2 further including spring means on the gauge secured to the other end of the filamentary member to urge the camming surfaces toward one another and aid in said axial movement of the filamentary member.

8. A gauge as claimed in claim 2 wherein the filamentary member is a wire member, and the probe member has a passageway to accommodate the axial movement of the wire member.

9. A gauge for measuring a distance between spaced apart surfaces comprising: an elongate probe member adapted to be inserted between the surfaces and having a greater width than thickness and subject to flexure at right angles to its width, said probe member having at one end a portion swingably connected to another portion, each portion having a camming surface slidably engaging a camming surface of the other portion for relative movement substantially transversely of the probe member with said camming surfaces imparting a movement to one of said portions longitudinally of the probe member, contact means on each portion adapted to engage one of the surfaces upon relative opposite movement of the portions transversely of the probe member, said probe member provided with a channel extending longitudinally thereof, a filamentary member secured at one end to one of said portions which is movable relatively to the probe member, with such filamentary member disposed within said channel and extending longitudinally of the probe member to translate the movement of said one portion transversely of the probe member to movement axially of the probe member, said filamentary member being flexible with and upon flexure of the probe member, and means at the opposite end of the probe member from said portions connected to the filamentary member and operable to measure the amount of said axial movement.

10. A gauge for measuring a distance between spaced apart surfaces comprising: an elongate probe subject to flexure in at least one direction transversely of its length, a flexible elongate member extending longitudinally of the probe, said probe provided with a channel extending longitudinally thereof and proportionally dimensioned in cross section to receive the flexible elongate member for closely guided movement, means at one end of the probe connected to said elongate flexible member to impart axial movement thereto and including a pair of contacts movable relative to each other, and means at the opposite end of the probe for detecting axial shift of the elongate flexible member and responsive to axial shifting thereof, and means operatively connected to said flexible elongate member for tensioning the same in a direction away from said contacts.

References Cited in the file of this patent

UNITED STATES PATENTS

| 1,431,613 | Wittner | Oct. 10, 1922 |
| 2,397,196 | Neff | Mar. 26, 1946 |
| 2,467,847 | Mozur | Apr. 19, 1949 |
| 2,557,702 | Soukup et al. | June 19, 1951 |
| 2,775,818 | Meyer | Jan. 1, 1957 |